United States Patent [19]

Febey

[11] Patent Number: 5,161,430
[45] Date of Patent: Nov. 10, 1992

[54] PEDAL STROKE RANGE ADJUSTING DEVICE

[76] Inventor: Richard W. Febey, P.O. Box 49 (100 Ottawa), Grayling, Mich. 49738

[21] Appl. No.: 524,977

[22] Filed: May 18, 1990

[51] Int. Cl.$^5$ .............................................. G05G 1/14
[52] U.S. Cl. ................... 74/594.7; 74/594.4; 74/594.1
[58] Field of Search ............................ 74/594.1–594.7; 482/59

[56] References Cited

U.S. PATENT DOCUMENTS

| | | | |
|---|---|---|---|
| 2,533,011 | 12/1950 | Hill | 74/594.1 |
| 3,888,136 | 6/1975 | Lapeyre | 74/594.4 |
| 4,225,130 | 9/1980 | Zimmerman | 272/73 |
| 4,648,287 | 3/1987 | Preskitt | 74/594.1 |
| 4,706,516 | 11/1987 | Xi | 74/594.1 |
| 4,850,245 | 7/1989 | Feamster et al. | 74/594.1 |
| 4,867,441 | 9/1989 | Blakeman | 74/594.4 X |
| 4,973,046 | 11/1990 | Maxwell | 272/73 |

FOREIGN PATENT DOCUMENTS

| | | | |
|---|---|---|---|
| 694226 | 7/1953 | United Kingdom | 74/594.7 |
| 814128 | 5/1959 | United Kingdom | 74/594.7 |

Primary Examiner—Vinh T. Luong
Attorney, Agent, or Firm—Robert K. Wallor

[57] ABSTRACT

A pedal radius adjustment device comprised of a frame mounted onto the existing crank arm of a bicycle or similar exercise machine by a screw passing through the existing crank arm pedal mounting hole and attaching to the adjustment frame, and by a bracket mounted to the adjustment frame around the crank arm. The contact side of the frame is grooved to align with the pedal crank arm. The pedal is attached to a sliding block within the adjustment frame and is adjusted by a hand operated pull T-pin at multiple, known-radius, settings prearranged on the adjustment frame. In another embodiment, the T-pin is held in place by magnetic attraction between the T-pin and the sliding block.

12 Claims, 2 Drawing Sheets

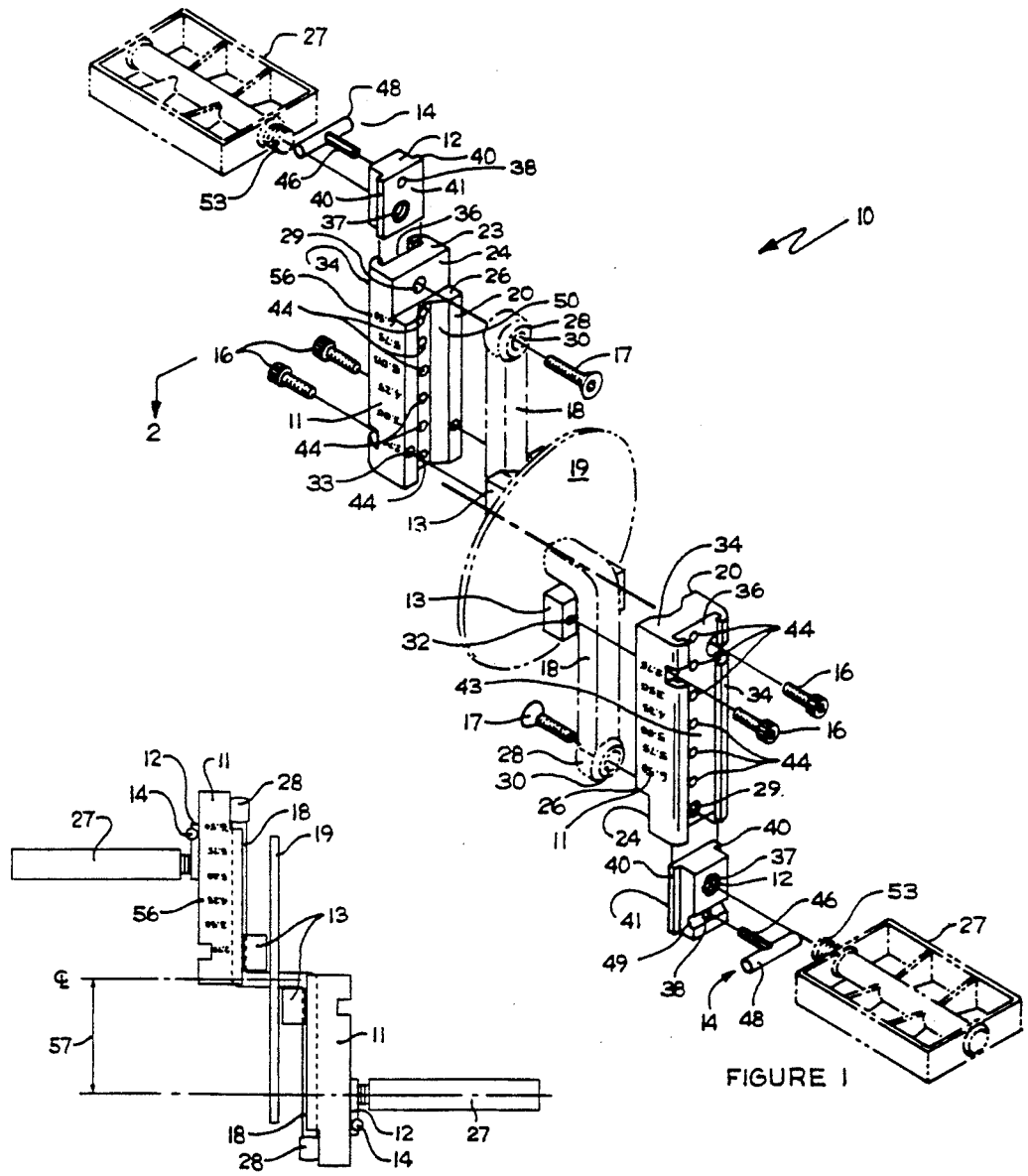
FIGURE 1
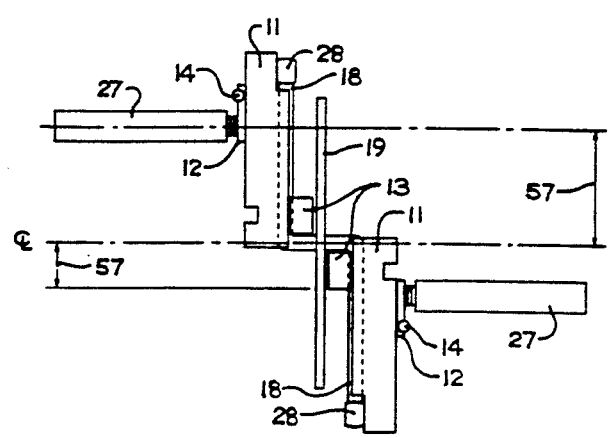
FIGURE 5
FIGURE 6

PEDAL STROKE RANGE ADJUSTING DEVICE

BACKGROUND OF THE INVENTION

1. Field of the Invention

The present invention relates generally to circularly movable cranks, and in particular, to crank arm radius adjusting mechanisms useful for pedal powered vehicles such as bicycles and stationary exercise cycles.

2. Discussion of the Prior Art

Devices for the adjustment of a crank arm radius or stroke length for a bicycle driving crank have been known in the art for a considerable period of time. A summary of such prior art is provided in the specification of U.S. Pat. No. 4,648,287, issued Mar. 10, 1987 to J. Preskitt for "Pedal Stroke Adjuster for a Bicycle or Exercise Machine".

One early version of such a device can be noted in U.S. Pat. No. 2,533,011, issued Dec. 5, 1950 to W. Hill for "Bicycle Pedal Adapter". In this device, a special collar or bracket is configured to slidably engage over a distal end of a standard bicycle crank arm to extend substantially radially inwardly from the typical threaded pedal engaging hole found proximate to the distal end of the crank arm. Bolt means are inserted through appropriate holes in the collar or bracket and into the threaded hole of the crank arm to secure the collar or bracket to the crank arm. The collar or bracket includes a flange portion having holes therethrough disposed to be substantially adjacent a radially inwardly extending portion of the crank arm. The pedal is engaged to the flange portion through its holes. Each pedal of the pair normally employed on a bicycle or stationary exercise cycle is so mounted to respective flanges of respective collars or brackets such that they effectively act on their respective crank arms at equally reduced radii from the center of rotation of the drive crank of the bicycle. It would appear from the teaching of the Hill patent that a single radius of adjusted stroke length is available from a particular set of collars or brackets, and that other radii would require the installation of different collars or brackets.

The above-mentioned patent to Preskitt, U.S. Pat. No. 4,648,287, provides a device having a range of discrete adjustment radii at which the pedals of the bicycle may be disposed to act on respective crank arms. This is accomplished by providing an adjustment frame extending substantially radially inwardly from the normal pedal engagement hole of the crank arm, located proximate to its distal end. The adjustment frame is provided with appropriate spacers to accommodate attachment of the frame to a crank arm that diverges from the plane of rotation of the crank along the length of the crank arm to its distal end. With said spacers emplaced, a first end of the adjustment frame is coupled to the distal end of the crank arm by bolt means extending through the pedal mounting hole at the distal end of the crank arm. The obverse end of the adjustment frame is held to a radially inwardly extending portion of the crank arm by a bracket encircling the crank arm. A block, containing a hole through which the pedal is engaged, is slidably coupled to the adjustment frame so that it is capable of motion relative thereto substantially along the extent of the crank arm. The frame is formed to have transverse notches along one side of the slide path followed by the sliding block, which notches are engaged by detent means carried within the sliding block. The detent means are manually operable to release the detent from engagement with a particular notch on the adjustment frame so that the sliding block, with the pedal attached thereto, may be repositioned to a differing stroke radius, whereat the detent engages an appropriate notch. Additionally, the block may be locked into a particular radial position by a set screw acting through the block against the adjustment frame.

Preskitt also teaches several alternate embodiments. A first is similar to the preferred embodiment except that it employs a second detent mechanism engaging notches on the adjustment frame positioned to the opposing side of the sliding block from those of the preferred embodiment. Another alternate embodiment provides for substantially continuous radial adjustment by coupling the sliding block to a lead screw extending through the adjustment frame parallel with the extent of the crank arm. Rotation of the lead screw, which is journaled to rotate within the adjustment frame at either end, causes the sliding block to move either inwardly or outwardly, depending on the pitch direction of the lead screw and the direction of its rotation about its longitudinal axis. Yet another embodiment taught by Preskitt foregoes the use of a sliding block entirely by forming a plurality of spaced apart holes along the extent of the adjustment frame substantially parallel with the extent of the crank arm. Each of these holes is independently adapted to accept engagement of the pedal. In a further variation on the immediately preceding embodiment, Preskitt replaces the existing crank arm of the bicycle with a frame clamping directly to the crank shaft at its axis of rotation, this frame having a plurality of radially spaced apart holes for accepting engagement of the pedal at differing radii.

Where extension of the effective radius of a bicycle crank arm is desired, a device similar to that described in U.S. Pat. No. 4,850,245, issued Jul. 25, 1989 to N. Feamster, et. al. for "Bicycle Crank and Pedal Structure", may be employed. The Feamster device utilizes a sleeve configured to slidably telescope over the extent of the existing crank arm. The sleeve contains a plurality of holes therethrough, the most outwardly radially located hole being adapted to engage and support a pedal. In use, the sleeve is telescoped onto the crank arm until the desired extended pedal radius is established. Thereat, one of the plurality of radially inwardly spaced apart holes through the sleeve is aligned with the normal pedal engaging hole at the distal end of the crank arm. Bolt means are passed and engaged through this combined hole to secure the sleeve to the crank arm.

Without making specific reference thereto herein, the literature surrounding the present invention contains descriptions of many differing embodiments of devices useful in changing the pedal radius of a bicycle or similar apparatus. Those set forth hereinabove are believed to be the most relevant among the art which is presently known to the inventor hereof. In brief, the simplest known of such devices is the addition of blocks directly to the foot support portions of the pedals. While this approach accommodates user leg extension relative to the seat position, it does not appreciably alter the radius through which the foot moves in following the motion of the pedal. In each of such prior art devices, cited specifically herein or otherwise, closer concern should be given the examination thereof for their respective capabilities of accommodating differing ranges of motion to which a user may be limited, while also considering the ease with which changes in radius may be accomplished. Of further concern are such factors as ease of assembly, complexity of structure and design, and stability relative to off-set of the pedal from the extent of the crank arm. All such factors appear to vary greatly between the several references and other known approaches.

SUMMARY OF THE INVENTION

Accordingly, it is an object of the present invention to provide an improved means for modifying the length of pedal stroke of a bicycle or stationary exercise cycle without altering an existing pedal crank arm.

Another object of the present invention is to provide a device for selectably adjusting the pedal stroke length of a bicycle or stationary exercise cycle that is adaptable to rapid adjustment of pedal stroke length in an efficient manner.

An additional object of the present invention is to provide for incremental pedal stroke length adjustment capability between at least the normal full pedal stroke length and a pedal stroke length less than twenty percent of the full stroke length.

A further object of the present invention is to provide a device for selectably adjusting the pedal stroke length of a bicycle or stationary exercise cycle having sufficient structural strength and features of construction to enable its safe use.

It is another object of the present invention to provide such a device capable of being readily produced at a reasonable cost.

These, and further objects, advantages, and features of the present invention that may become evident or that may be suggested through the following descriptions, are provided by an apparatus that, for each of a pair of pedal crank arms of a bicycle or stationary exercise cycle, includes a frame member that can be coupled to either pedal crank arm, with a like frame member being coupled to the other crank arm, a bracket member for securing the frame member to the crank arm, a flanged block member slidably engaging with the frame member to provide for pedal length adjustment, means for retaining the block member in a desired position relative to the frame member, and means for appropriately assembling the apparatus for use. A surface of the frame member that is intended for aligned contact with the crank arm has a notched groove extending along its length to ensure alignment of the frame member along the length of the crank arm. The slidable block member includes a threaded hole attaching a corresponding pedal thereto. As is common practice in bicycle manufacture, a right pedal and a left pedal are provided with mutually opposite threads on shanks engaging distal ends of the crank arms. Thus, the sliding block members are characterized as either right or left, with appropriate thread direction in the hole in which a corresponding right or left pedal is accepted. A pull T-pin is fitted into the slidable block member through a second, unthreaded hole therethrough as a means for releasably retaining the block member in position relative to the extent of the frame member. The frame member includes a plurality of these unthreaded holes distributed along the extent of the frame member in alignment with the extent of the crank arm for pedal stroke length adjustment and for locking and securing the block member in selectable locations along the extent of the frame member. Further detail of the present invention, and alternates thereto, will become evident through the detailed description set forth below.

BRIEF DESCRIPTION OF THE DRAWING

In the accompanying drawing, wherein like elements, components, and features and respectively indicated by like reference numbers and symbols throughout:

FIG. 1 is a perspective exploded view of an apparatus in accordance with the present invention, indicating its assembly and the manner of attachment thereof to standard bicycle components;

FIG. 5 is a partial end view of a bicycle or stationary exercise cycle indicating a plurality of pedal stroke lengths, with slidable block members of both sides being at equal stroke radii; and FIG. 6 is a partial end view, as in FIG. 5, showing slidable members of opposed sides at unequal stroke radii.

DESCRIPTION OF THE PREFERRED EMBODIMENTS

Figure 2:
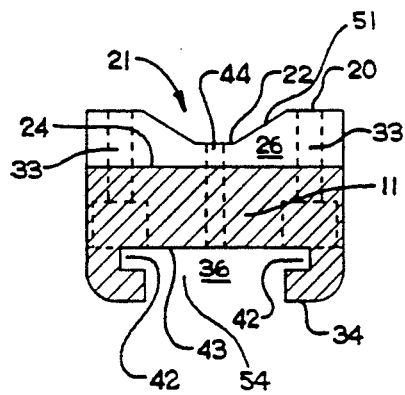
FIG. 2 is a cross-sectional view of a frame member of the apparatus in accordance with the present invention, taken along a plane indicated as 2—2 in FIG. 1.

Referring first to FIG. 1, an apparatus for adjustably varying a pedal stroke length of a bicycle or stationary exercise cycle in accordance with the present invention is indicated, in exploded perspective view, generally at 10. The apparatus 10, shown in relation to a crank assembly of a standard bicycle or stationary exercise cycle having diametrically opposed crank arms respectively coupled to axially opposed sides of the crank, may be observed to comprise, for each side of the crank 19, a frame member 11, a slidable block member 12, a bracket member 13, a T-pin 14, a pair of bolts 16 for coupling the bracket member 13 to the frame member 11, and a bolt 17 for coupling the frame member 11 to a crank arm 18 on the corresponding side of the crank 19. For simplification of further description, those elements of the apparatus 10 residing on one side of the crank 19 are described in detail hereinbelow. The like elements residing on the other side of the crank 19 are to be understood as being identical to those described hereinbelow, except as may be particularly pointed out in these descriptions.

With reference to FIG. 2 in conjunction with FIG. 1, the frame member 11 is configured generally as a rectangular solid from which portions are removed. Such a rectangular solid is defined to have a length approximately equal to, and directed substantially along, a length of a standard bicycle crank arm 18, a width approximately three times the dimension of the crank arm 18 measurable in a plane parallel to the plane of revolution of the crank 19, and a thickness, directed normal to the plane of revolution of the crank 19, sufficient to provide for engagement of the slidable block member 12 with the frame member 11 while maintaining structural integrity and durability of the apparatus 10 as assembled onto the crank arm 18. The aforesaid dimensions of the frame member 11 are provided as examples to establish the relative size of the frame member 11, and are not to be construced as limiting the configuration of the frame member 11 beyond any mechanical constraints that may arise to accommodate operation of the crank arm 18 to drive the bicycle or stationary exercise cycle.

The general rectangular block configuration of the frame member 11 is modified for the stated purposes herein to include set-back, notch, groove and hole arrangements. A first surface 20 of the frame member 11, identifiable as a planar surface bounded by the length and width of the generally rectangular block of the frame member 11, hereinafter to be known as the contact surface 20 of the frame member 11, is configured to have a substantially V-shaped groove 21 extending centrally along the length of the frame member 11. This V-shaped groove 21 is further configured to include a web surface 22 substantially parallel to said contact surface 20, said web surface 22 separating dihedral surfaces 50 and 51 forming the V-shape. An illustrated lower end 23 of the frame member 11 appearing to the right of the crank 19 is configured to have a set-back planar surface 24 formed to be parallel to the plane of the contact surface 20 and extending along the length of the frame member 11 from said upper end 23 to a shoulder 26. Thus, the groove 21 extends from the shoulder 26 to an end 34 of the frame member 11 obverse to the upper end 23. The contact surface 20 is, of course, not present in the set-back surface 24 portion of the frame member 11. The importance of the several surfaces thus described will be revealed during description of the installation of the frame member 11 to the crank arm 18, to be given below.

In accordance with the objects of the present invention, the apparatus 10 is to be configured to be attachable to a crank arm 18 of a bicycle or stationary exercise cycle so as to allow adjustment of the pedal stroke length. To that end, the pedals 27 of the bicycle or stationary exercise cycle are first removed from their respective engagement with distal ends 28 of the crank arms 18. While describing only the crank arm 18, illustrated to the right of the crank 19, the following has equal application to the other crank arm 18. The frame member 11 is placed along the extent of the crank arm 18 such that the dihedral surfaces 50 and 51 forming the V-shaped groove 21 and the web surface 22 therebetween are in substantial contact with the extent of the crank arm 18. Since the typical crank arm 18 includes an enlarged portion, including an increased thickness, at its distal end 28 to accommodate normal attachment of the corresponding pedal 27 thereto, the set-back surface 24 of the frame member 11 is disposed to be positioned substantially in alignment with the distal end 28 portion of the crank arm 18. A first hole 29, formed through the thickness of the frame member 11 proximate to its upper end 23 and centrally of the width of the frame member 11, is disposed to be within the set-back surface 24 region of the frame member 11. When the hole 29 is in alignment with a pedal engaging hole 30 through the distal end 28 of the crank arm 18, the bolt 17 is passed through the pedal engaging hole 30 at the distal end 28 of the crank arm 18 so as to threadably engage matching threads formed internally in the first hole 29 of the frame member 11, thereby holding the frame member 11 in the appropriate longitudinal position relative to the extent of the crank arm 18.

The bracket member 13 is configured to include a V-shaped groove 31 complementing that formed on the contact surface 20 of the frame member 11. The bracket 13 has an extent to each side of the V-shaped groove 31 such that it has a total width substantially equal to the width of the frame member 11. Each such side extent of the bracket member 13 has a hole 32 formed therethrough in a direction normal to the surface containing the groove 31. A further pair of holes 33 are formed through the thickness of the frame member 11 at transversely spaced apart positions disposed substantially proximate to a second end 34 of the frame member 11 obverse to said upper end 23, the transverse spacing between centers of said holes 33 being equal to the spacing between centers of the holes 32 in the bracket member 13. With the frame member 11 being held at its upper end 23 to the distal end 28 of the crank arm 18 by the bolt 17, the bracket member 13 is placed between the crank arm 18 and the crank 19 such that the extent of the groove 31 is in contact with the extent of the crank arm 18. Translation of the bracket member 13 along the extent of the crank arm 18 will produce a position of the bracket member 13 whereat the holes 32 in the bracket member 13 are aligned with the holes 33 in the frame member 11. The bolts 16 are then passed, respectively, through the holes 33 in the frame member 11 to threadably engage with matching threads formed in the holes 32 in the bracket member 13. Upon appropriate tightening of the bolts 16 and the bolt 17, the frame member 11 will be rigidly coupled to the crank arm 18, with a fixed longitudinal position and rotational orientation established therebetween.

It is to be noted that the length of the bolt 17 is to be sufficient to engage the frame member 11 through the pedal egaging hole 30 of the crank arm 18, but it is to be limited in length not to project through the thickness of the frame member 11, as said thickness is further limited below. Similarly, the lengths of bolts 16 are limited to that length sufficient to pass through the holes 33 in the frame member 11 so as to engage with the holes 32 in the bracket member 13 without projecting fully through the holes 32. With regard to the lengths of the bolts 16, the holes 33 in the frame member 11 are countersunk appropriately to place the heads of bolts 16 fully within the surfaces defining the frame member 11 such that said heads do not impede the further functioning of the frame member 11, as set forth below.

Continuing with reference to FIG. 1 and FIG. 2, a surface 52 of the frame member 11, obverse to the contact surface 20 thereof, is configured along its entire length to include a generally T-shaped notch 36 accommodating the slidable block member 12. The desired characteristics of the notch 36 may be more readily determined from reference to the configuration of the slidable block member 12. The slidable block member 12 is configured as a generally rectangular element having a length oriented in a direction parallel to the length of the frame member 11, a width parallel to the width of the frame member 11, and a thickness oriented in a direction parallel to thickness of the frame member 11. The width and length of the slidable block member 12 are adapted to accommodate forming a threaded hole 37, centrally of the width of the slidable block member 12, through the thickness of the slidable block member 12, said hole 37 being so adapted and threaded to accept a correspondingly threaded shank 53 of the pedal 27. It is to be noted that the shanks 53 of the pedals 27 utilized on opposite sides of a bicycle or similar apparatus are provided with oppositely directed threads to prevent unscrewing of the pedals 27 during forward pedaling of the apparatus. Thus, the slidable block members 12 are to be identified as either left or right. The length of the slidable block member 12 is further adapted to accommodate the independent formation of a further hole 38 through its thickness, said hole 38 also being disposed centrally with respect to the width of the slidable block member 12. The slidable block member 12 is further formed to include an integrally formed pair of flanges 40 increasing the width of the slidable block member 12 along the length of the sides forming the thickness dimension, said flanges 40 having a thickness from a surface 41 of said slidable block member 12 adapted to slide along the notch 36 of the frame member 11 to as to slidably engage grooves 42 forming a part of the notch 36.

The T-shaped notch 36 of the frame member 11 can, in an alternative, be described as a generally rectangular cavity 54 extending fully along the length of the frame member 11, said cavity 54 having a width accommodating passage of the slidable block member 12, as described above, therealong, with grooves 42 formed proximate to an innermost longitudinal surface 43 of said cavity 54, said grooves 42 increasing the width of that portion of the cavity 54 so as to accommodate sliding of the flanges 40 of the slidable block member 12 along the length of the frame member 11.

The frame member 11 is further formed to include a plurality of pedal stroke length positioning holes 44, each extending through the thickness of the frame member 11, said holes 44 being disposed in a calibrated spaced apart arrangement along a line located centrally of the width of said frame member 11. The holes 44 in the frame member 11 and the hole 38 in the slidable block member 12 are so configured and sized that a central leg 46 of the T-pin 14 is removably insertable therethrough when the hole 38 is appropriately aligned with a selected one of the holes 44 corresponding to a desired pedal stroke length of the apparatus 10.

Figure 3:
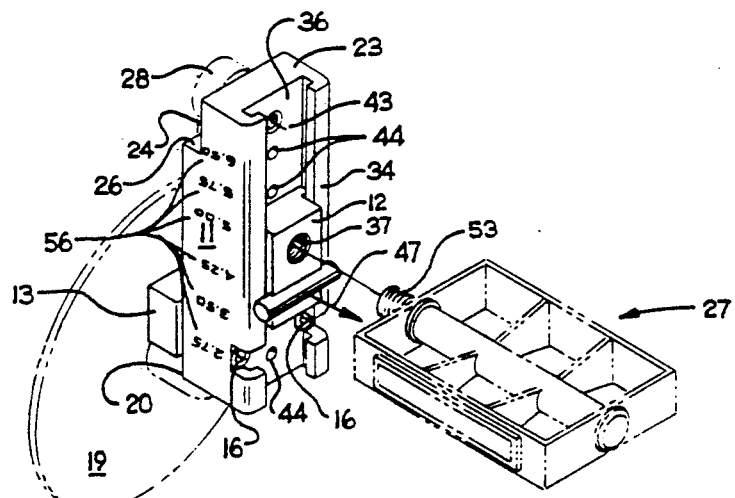
FIG. 3 is a perspective view of the apparatus of the present invention, illustrating, for one side of a crank structure, a principal orientation of assembly of a slidable block member thereof.

Referring next to FIG. 3, a right half of the apparatus 10 is illustrated as partially assembled onto the crank arm 18, with the slidable block member 12 held in a selected pedal stroke length position by the T-pin 14. The pedal 27 is shown in an exploded position for clarity. With the shank 53 of the pedal 27 engaged with the hole 37 in the slidable block member 12, the pedal stroke length of the apparatus 10 may be varied by removing the T-pin 14 from the slidable block member 12 by manually translating it in the direction indicated by an arrow 47. The slidable block member 12 and the attached pedal 27 may then be repositioned along the length of the frame member 11 such that the hole 38 in the slidable block member 12 becomes aligned with another, selected, one of the holes 44 in the frame member 11, whereat the T-pin 14 is manually reinserted into the hole 38 and the selected hole 44 in a direction opposite to that indicated by the arrow 47. The positioning of the illustrated uppermost hole 44, most proximate to the upper end 23 of the frame member 11, is such that the pedal axis defined by the hole 37 in the slidable block member 12, when the slidable block member 12 is oriented relative to the frame member 11 as shown in FIG. 3, is substantially aligned with the pedal engaging hole 30 at the distal end 28 of the crank arm 18, thereby providing a pedal stroke length substantially equal to that of the bicycle or stationary exercise cycle not employing the apparatus 10 of the present invention. Relocation of the slidable block member 12 to be positioned at each of the holes 44, in sequence progressing away from the upper end 23 of the frame member 11, accordingly reduces the pedal stroke length. In a preferred embodiment of the apparatus 10 serving as the primary basis for the drawings herein, the approximate selectable pedal stroke lengths are established to be, sequentially inwardly starting from the upper end 23 of the frame member 11: 6.5 inches (approximately 165 millimeters); 5.75 inches (approximately 146 millimeters); 5.0 inches (approximately 127 millimeters); 4.25 inches (approximately 108 millimeters); 3.5 inches (approximately 89 millimeters); and 2.75 inches (approximately 70 millimeters). Alternate configurations providing a differing number of holes 44 and a differing set of pedal stroke lengths may be fabricated as an alternate frame member 11 including the desired set of holes 44.

The T-pin 14 is further configured to be used as a tool for the assembly and disassembly of the apparatus 10. The central leg 46 of the T-pin 14 is formed of a sufficiently rigid and durable material to have a shape engagable with the heads of bolt 17 and bolts 16 in order to rotate them about their respective axes for removal or insertion with respect to their threaded holes. In the preferred embodiment herein, the central leg 46 of the T-pin is formed to have a hexagonal cross-section appropriately matching Allen head bolts 16 and 17. The T-pin 14 includes a cross bar 48 to serve both as a handle during use of the T-pin 14 as a tool and as a stop determining the extent to which the central leg 46 of the T-pin 14 may be inserted into the combined holes 38 and 44.

For convenience of use, including safety of the user, appropriate surfaces of the components of the apparatus 10 may be provided with rounded edges and corners. To preclude interference between the cross bar 48 of the T-pin 14, engaged into the holes 38 and 44, and the pedal 27, engaged into the hole 37, the slidable block member 12 may be provided with a transverse notch 49 accepting the cross bar 48. The length of the central leg 46 of the T-pin 14 is thus to be foreshortened accordingly such that full insertion thereof into a selected hole 44 may be accomplished without contacting the crank arm 18 with the distal end of the central leg 46. Additionally, the frame member 11 may be provided with indexing markings 56 corresponding to the pedal stroke lengths at the several positions of the slidable block member 12, as indicatable by the position of the cross bar 48 of the T-pin 14, in the notch 49, at each such position. It is preferred that the markings 56 be etched into the surface of the frame member 11, with a high visibility paint or other similar product affixed into the etched markings 56. In the alternative, the markings 56 may be embossed, or applied in the form of decals or paint.

Figure 4:
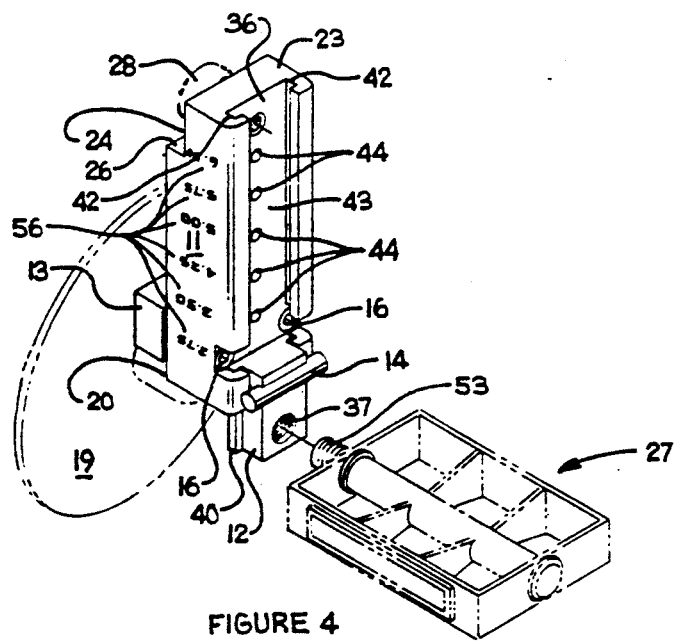
FIG. 4 is a perspective view of one side assembly of the apparatus of the present invention, illustrating an assembly of the slidable block member thereto to attain a shortest pedal stroke length.

Referring next to FIG. 4, an extremely short pedal stroke length may be established for the present apparatus 10 through removal of the T-pin 14, sliding the slidable block member 12 and attached pedal 27 completely out of the notch 39 of the frame member 11, reversing, by rotating the slidable block member about the axis of the hole 37 through 180 degrees of angle, the orientation of the slidable block member 12 from that shown by FIG. 3 to that shown by FIG. 4, reengaging the thus reoriented slidable block member 12 partially with the notch 39 of the frame member 11, aligning the hole 38 in the slidable block member 12 with the lowermost hole 44 in the frame member 11, and reinserting the T-pin into the aligned holes 38 and 44. In this assembled configuration, the slidable block member 12 projects partially beyond the lowermost extent of the length of the frame member 11 such that the position of the pedal axis at hole 37 of the slidable block member 12 is more proximate to a central axis of the crank 19 than is attainable for any selected positioning of the slidable block member 12 in the orientation shown by FIG. 3. For the reversed orientation of the slidable block member 12 illustrated by FIG. 4, the preferred embodiment provides a pedal stroke length of approximately 1.25 inches (approximately 32 millimeters).

Referring next to FIG. 5, as viewed from an end of the bicycle or stationary exercise cycle, the crank 19 is illustrated to be at a rotational position whereat the crank arms 18 are respectively up and down. The slidable block members 12 are shown to be positioned along the corresponding frame members 11 at respectively equal radii 57 from the axis of rotation of the crank 19. Other optional pedal stroke lengths may be established, as previously described, for radii indicated generally at 58.

Referring lastly to FIG. 6, an end view of the crank 19 is illustrated to show the slidable block member 12 of the right side to be coupled to its corresponding frame member 11 at a first pedal stroke length radius 57, while the slidable block member 12 of the left side is coupled to its corresponding frame member 11 at a different pedal stroke radius 58. This unbalanced condition is useful when a user has limitation of leg lotion, with the right leg being more severely restricted. Of course, the situation could be reversed, and the difference between the radius and the left radius either reduced or increased, depending upon particular user circumstances and physcial limitations.

From the preceding descriptions, it can be readily noted that variation in the number of holes 44 incorporated in the frame member 11, variation in their mutual spacing, and variation in the separation between hole 37 and hole 38 on the slidable block member 12, can provide an apparatus 10 having one discrete set of pedal stroke lengths for orientaton of the slidable block member 12 as shown by FIG. 3 and a second, distinct, discrete set of pedal stroke lengths for orientation of the slidable block member 12 as shown by FIG. 4.

In each of the embodiments illustrated, described, or suggested hereinabove, the T-pin 14 is envisioned to be held in its inserted position through the hole 38 of the slidable block member 12 and into one of the holes 44 of the frame member 11 by frictional engagement arising from the tendency for the slidable block member 12 to move along the notch 39 of the frame member 11 during pedaling force applied by a user. Additional security against the inadvertent disengagement of the T-pin 14 from the selected hole 44 of the frame member 11 can be provided through the use of magnetic attraction between the cross bar 48 and the slidable block member 12. In one such embodiment, the cross bar 48 of the T-pin 14 is formed as a magnet, while the slidable block member 12 is made of a magnetic material. Another alternative for this purpose would include incorporation of a detent housed within the slidable block member 12 to engage a notch formed around the circumference of the central leg 46 of the T-pin 14 when the T-pin 14 is fully inserted in its proper position.

While the preceding descriptions, with reference to the accompanying drawings, have indicated a preferred embodiment with specific detail, other embodiments, configurations, and modifications thereof, or of specific elements of the apparatus 10 set forth herein, are readily apparent to those having ordinary knowledge of the art in view of the present teachings. All such alternate embodiments, mechanizations and modifications are contemplated to be within the intent of the present invention, which shall be limited only by the scope of the claims appended hereto.

I claim:

1. A pedal stroke length adjustment device, for attachment to standard crank arms of a crank assembly of a bicycle or stationary exercise cycle, said device supporting therefrom standard pedals associated with such a bicycle or a stationary exercise cycle, comprising:

a first block member, adapted for use on a left side of said bicycle or stationary exercise cycle, formed from a durable solid material and configured substantially as a rectangular parallelopiped having pairs of opposed surfaces limiting a length, a width, and a thickness, respectively, said first block member having a pair of opposed flanges, respectively integrally formed along opposed surfaces bounding said width of said first block member, said flanges being disposed thereon to be proximate to a first surface of the pair of opposed surfaces bounding said thickness of said block member, said flanges being formed to be substantially mutually parallel to extend in a direction of said length of said first block member, and in opposing mutual registration across said width of said first block member, said first block member having a first hole formed therethrough, in a direction of its thickness, a central axis of said first passing at a position substantially centrally with respect to the width of said first block member and with respect to the length of said first block member, said first hole having internal screw threads formed therealong through said thickness, said screw threads being adapted to accept and engage with extenal threads commonly formed on a standard threaded shank of a standard left side bicycle pedal, said first block member further including a second hole formed through its thickness, at a position substantially central with respect to the width direction and, in the length direction, intermediate between said first hole and a plane of one of the opposed length defining surfaces, said first hole and said second hole being mutually non-intersecting through the thickness of said first block member:

a second block member, for use on a right side of said bicycle or stationary exercise cycle, identical to said first block member in all respects except that the screw threads formed internally along said first hole formed through said second block member are generally characterized to have a pitch direction opposite to the pitch direction of the screw threads formed internally along said first hole formed through said first block member, said first hole formed through said second block member accepting and engaging with external threads commonly formed on a standard threaded shank of a right side bicycle pedal;

a pair of frame members, each capable of being attached either to a crank arm on the left side of the crank structure of the bicycle or stationary exercise cycle or to a crank arm on the right side of such apparatus, with one of said pair of frame members being deployed to be on the left side and the other frame member of the pair being deployed to be on the right side, each of said pair of frame members being configured to include a groove formed along a longitudinal surface of said frame member, said surface, together with a substantially parallel opposed surface of the frame member, bounding the thickness of the frame member, said groove being adapted to at least partially accept therealong a crank arm of a standard bicycle crank structure, said frame member further including a channel formed longitudinally along a surface of said frame member obverse to said surface of said frame member on which said longitudinal groove is formed, said channel being so configured as to accept said block member therein in a manner allowing said block member to be slidably positioned at any desired position along the longitudinal extent of said channel of said frame member, the length of said block member extending in the same direction as the length of the frame member, with said channel engaging said flanges of said block member, each frame member having a first hole formed through its thickness proximate to a first longitudinal end of said frame member, a central axis of said first hole being situated to be substantially parallel to said first longitudinal end surface of said frame member and in a plane orthogonally bisecting the width of said frame member, said first hole progressing through said frame member from said channel-bearing longitudinal surface through said groove-bearing surface, said first hole being fabricated with internal screw threads fully through the thickness of said frame member, each said frame member further including a pair of second holes formed therethrough to be parallel to said first hole, said pair of second holes being disposed proximate to a second longitudinal end of said frame member, spaced apart in the direction of the width of said frame member into an arrangement equidistantly spanning said channel and said groove, said pair of second holes being formed to not include internal screw threads, each having a diameter greater than a maximum pitch diameter of the screw threads formed in said first hole through said frame member, each said frame member including a plurality of third diameter holes formed therethrough, each respectively oriented to be parallel with said first hole through the frame member and with the pair of second holes through the frame member, said plurality of third diameter holes being spaced apart in the longitudinal direction of said frame member so as to pass from said channel-bearing surface through said groove-bearing surface of said frame member, central axes of each of said plurality of third diameter holes residing in a plane orthogonally bisecting the width of said frame member, each frame member being further configured to have a reduced thickness for a portion of the longitudinal extent of the frame member, extending from the first longitudinal end surface proximate to the position of said first hole through said frame member to a shoulder residing toward said second longitudinal end surface of said frame member from the position of said first hole through said frame member by a distance substantially equal to the distance from said first hole through the frame member to said first longitudinal end surface of said frame member, said thickness of said frame member being reduced by uniform removal of material from said groove-bearing longitudinal surface throughout said reduced thickness portion of said frame member;

a pair of bracket members, one to be associated with the frame member on the left side of the bicycle or stationary exercise cycle and the other to be associated with the frame member on the right side of the bicycle or stationary exercise cycle, each bracket member being configured, from a durable rigid material, to partially wrap around a transverse dimension of the crank arm on the corresponding side of the bicycle or stationary exercise cycle proximate to a juncture of said crank arm with said crank structure, each bracket member being fabricated to include a pair of holes therethrough, directed so as to be parallel with the axis of rotation of said crank, said pair of holes through an individual bracket member being spaced apart by a distance equal to the spacing between the holes of the pair of second holes formed through the frame member, each of the pair of holes through the bracket member being formed to include internal screw threads therethrough, said threads being substantially identical to the internal screw threads formed within the first hole formed through the frame member;

a plurality of bolt means for removably coupling each said frame member, aligned so that the longitudinal extent of the frame member is in a direction extending along, and parallel to, said corresponding crank arm of the crank structure such that said first hole formed through said frame member is aligned with a threaded hole formed through the distal end of the crank arm of the crank structure, by which hole a corresponding pedal structure is usually coupled to the distal end of the crank arm of the crank structure, the pedal being removed therefrom herein, and such that said pair of second holes formed through the frame member are proximate to the axis of the crank structure and engagably aligned with said pair of internally threaded holes of the corresponding bracket member, said crank arm of the crank structure residing between said bracket member and said groove-bearing surface of said frame member, said means for removably coupling said frame member to said crank arm of the crank structure acting through said aligned combinations of holes;

means for releasably locking each said block member at a desired longitudinal position along the channel of the corresponding frame member, said means extending through said second hole formed through said block member and into engagement with a selected one of said plurality of third diameter holes formed through said frame member; and a left bicycle pedal attached to said first screw threaded hole formed through said left side or first block member, said left side or first block member being held in a desired longitudinal position along the channel of a first of the pair of frame members, and a right bicycle pedal attached to said first screw threaded hole formed through said right side or second block member, said right side or second block member being held in a desired longitudinal position along the channel of the other frame member of the pair of frame members.

2. The pedal stroke length adjustment device of claim 1, wherein said plurality of bolt means for coupling said frame members to corresponding crank arms of the crank structure of said bicycle or stationary exercise cycle comprises, for each said frame member:

a first bolt element, externally threaded to match the threads in the first hole formed through the frame member, said first bolt element passing through the pedal-accepting hole on the distal end of the corresponding crank arm of the crank structure to which the frame member is coupled without engaging the threads formed internally within said pedal-accepting hole, said first bolt element then engaging the internal screw threads of said first hole formed through said frame member; and a pair of common bolt elements respectively passing through said pair of second holes formed through said corresponding frame member to engage with mating internal screw threads formed in said pair of holes formed in said corresponding bracket member.

3. The pedal stroke length adjustment device of claim 2, wherein said plurality of third diameter holes formed through said frame member are spaced apart in the longitudinal direction of the frame member by selected desired distances referrable to said first hole formed through said frame member so that said corresponding block member may be positioned and held at a desired one of said plurality of third diameter holes to produce a desired, identifiable distance of said first hole formed through said block member from the axis of rotation of the crank structure of the bicycle or stationary exercise cycle, said block member being oriented with respect to said frame member such that said first hole formed through said block member is at a greater distance from the axis of rotation of the crank structure than said second hole formed through said block member.

4. The pedal stroke length adjustment device of claim 3, wherein said means for locking each said block member at a desired longitudinal position along said corresponding frame member comprises a pin removably inserted into said second hole formed through said block member to extend into a selected aligned one of said plurality of third diameter holes formed through said corresponding frame member.

5. The pedal stroke length adjustment device of claim 4, wherein said pin further comprises a transversely oriented handle to facilitate insertion of said pin into said aligned combination of holes and removal of said pin from said aligned combination of holes, said transverse handle further serving to limit the extent to which said pin is insertable into said aligned combination of holes.

6. The pedal stroke length adjustment device of claim 5, wherein said pin and said handle are further configured such that a distal end of said pin, obverse to said handle, is adapted to engage with appropriately configured heads of said first bolt element and said pair of common bolt elements, associated with each side of said bicycle or stationary exercise cycle, such that said pin and handle, when removed from said selected one of the plurality of third diameter holes formed through said frame member and from said aligned second hole formed through said corresponding block member, may be utilized as a tool for accomplishing removal and installation of the first bolt element and the pair of common bolt elements disposed on either side of the bicycle or stationary exercise cycle.

7. The pedal stroke length adjustment device of claim 6, wherein said pin and handle are retained within said second hole formed through said block member and in said selected one of the plurality of third diameter holes formed through said frame member by an appropriately selected and disposed arrangement of magnets and magnetic materials distributed among said handle and said block member.

8. The pedal stroke length adjustment device of claim 7, wherein numeric inscription of each selectable pedal stroke length associated with each selectable longitudinal position of said block member relative to said corresponding frame member, as established by said plurality of third diameter holes formed through said frame member, selection of each such third diameter hole for alignment with said second hole formed through said block member serving to establish a particular stroke length as measured between a central axis of said first hole formed through said block member and the parallel axis of rotation of said crank structure of the bicycle or stationary exercise cycle, is visibly inscribed on a surface of said frame member at a visually readable location correspondingly adjacent to said handle of said pin when said pin is placed in said aligned holes with said block member situated at such selected longitudinal position.

9. The pedal stroke length adjustment device of claim 3, wherein an additional, further foreshortened pedal stroke length is established such that each said block member is cooperatingly engaged with said corresponding frame member in an orientation whereat the central axis of said first hole formed through said block member is disposed to be closer to the parallel axis of rotation of the crank than the central axis of said second hole formed through said block member, said second hole formed through said block member being aligned with that one of said plurality of third diameter holes formed through said frame member disposed on said corresponding frame member to be most proximate to the crank axis of rotation.

10. The pedal stroke length adjustment device of claim 1, wherein the selected longitudinal position of the second block member relative to the corresponding frame member for the right side of the bicycle or stationary exercise cycle is substantially equal to the selected longitudinal position of the first block member relative to the corresponding frame member for the left side of the bicycle or stationary exercise cycle.

11. The pedal stroke length adjustment device of claim 1, wherein the selected longitudinal position of the first block member relative to the corresponding frame member for the left side of the bicycle or stationary exercise cycle differs from the selected longitudinal position of the second block member relative to the corresponding frame member for the right side of the bicycle or stationary exercise cycle.

12. The pedal stroke length adjustment device of claim 1, wherein said frame members, said bracket members, and said means for removably coupling said frame members to corresponding crank arms of the bicycle or stationary exercise cycle are integrally formed as crank arms of the crank structure of said bicyle or stationary exercise cycle.

* * * * *